Feb. 11, 1930.  L. O. FRENCH  1,746,855
VALVE
Filed March 17, 1926
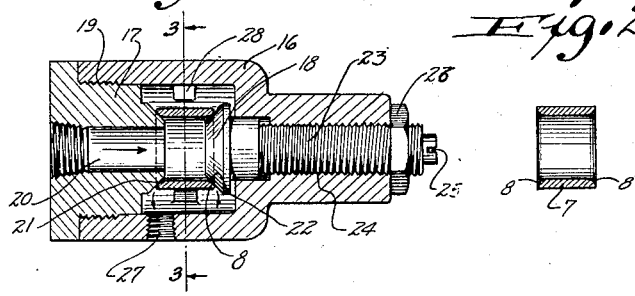
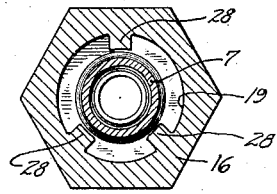
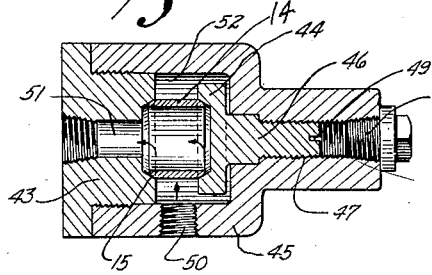
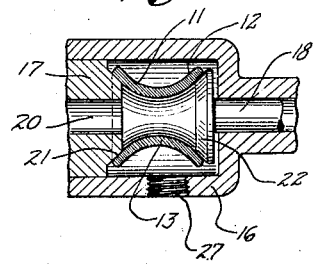
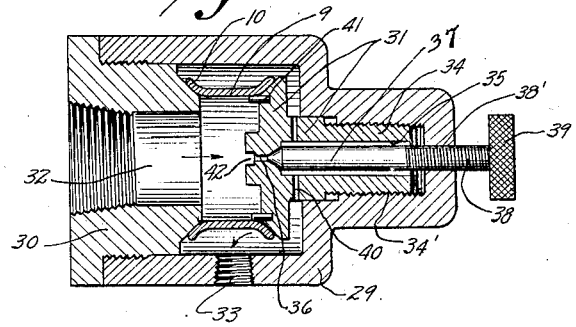
INVENTOR.

Patented Feb. 11, 1930

1,746,855

UNITED STATES PATENT OFFICE

LOUIS O. FRENCH, OF MILWAUKEE, WISCONSIN

VALVE

Application filed March 17, 1926. Serial No. 95,291.

The invention relates to valves.

The object of the invention is to provide a valve in which all of the functions usually performed by the valve, its spring, and other parts, are performed by only a single moving part, the valve itself, which is associated preferably with a fixed seat or abutment at each end, one of which seats is preferably adjustable so as to adjust the working pressure of the valve, the valve being made of spring metal so that its own elasticity is used to open or close it.

The invention further consists in the several features hereinafter set forth and more particularly claimed at the conclusion hereof.

In the drawings, Fig. 1 is a vertical sectional view of valve mechanism embodying the invention;

Fig. 2 is a detail sectional view through the valve;

Fig. 3 is a section taken on the line 3—3 of Fig. 1;

Fig. 4 is a view similar to Fig. 1, with certain additions;

Fig. 5 is a detail sectional view showing a modified form of valve;

Fig. 6 is a view similar to Fig. 1, showing a modification.

The fact that metal having resilient properties may be expanded or contracted is utilized in the present invention to provide a very simple and inexpensive valve mechanism. In Figs. 1 to 3, inclusive, the valve 7 consists of an integral cylindrical ring of spring metal having seats 8 formed at its ends. Similarly, in Fig. 4 the valve 9 consists of an integral ring of spring metal, cylindrical and having slightly flared ends 10 whose inner sides form seats. In Fig. 5 the valve 11 consists of an integral ring of spring metal having conically flared ends 12 curving to a central portion 13 of smaller diameter. In Fig. 6 the valve 14 is an integral cylindrical ring of spring metal having seats 15 formed on its end in the reverse manner to those of the valve shown in Fig. 2.

Referring to Figs. 1 and 3, the numeral 16 designates a casing member or support for a pair of abutments or valve seat members 17 and 18. The member 17 is in the form of a plug in screw-threaded engagement with the open end of a bore 19 formed in the member 16, and has a centrally disposed passage 20 and a valve seat 21. The member 18 has a valve seat portion 22 and a shank 23 in adjustable threaded engagement with a threaded bore 24 in the member 16, and extends outwardly beyond said member with a slot 25 in its end for turning it with a screw-driver or other suitable tool, and a locknut 26 is mounted on said shank. A passage 27 is provided in the member 16, and lugs 28 may be formed on the casing to assist in centering the valve, and may also act as stops to limit the expansion or opening movement of the valve.

With this construction, the valve 7 is positioned between and in engagement with the seat of the members 17 and 18, when the device is assembled, and any desired initial tension may be placed on the valve by the adjustment of the member 18, that is, by moving it toward the member 17 by turning the shank 23. The passage 20 is adapted to be connected up with a fluid-pressure source, and under these conditions when the fluid-pressure built up in the passage 20 and within the valve exceeds the limit imposed by the initial tension, the valve will expand, thus moving away at its ends from either or both of its seats to allow the fluid to pass into the bore 19 and out through the passage 27. When the pressure within the valve 7 decreases below the tension of said valve, the valve again moves into sealing contact with the members 17 and 18. Thus the inherent elasticity of the valve itself, influenced by a change in pressure acting on one side of the valve, is used to open or close the valve.

With the exception of the lugs 28, the valve 11 may be used in the structure shown in Fig. 1, and hence it is shown associated with the members 17 and 18, but in this case, due to the greater area at the flared ends 12, there is a tendency for the valve to expand to opening position at said ends to a greater extent than at its central portion 13.

The structure shown in Fig. 4 is generally similar to that shown in Fig. 1 and includes a casing 29, seating members or abutments 30 and 31, passages 32 and 33; the member 31 having a threaded stem 34 adjustably mounted in a threaded bore 34' of the casing 29 and having a centrally disposed bore 35 communicating with a bleed passage 36 normally closed by a needle valve 37 whose stem in coaxial with the bore 35 and has a threaded portion 38 engageable with a threaded bore 38' in the casing 29 and a knurled hand-wheel 39. Passages 40 extend from the bore 35 to the interior of the case 29. Pins 41 are provided on the front end of the abutment 31, and may also be provided on the front end of abutment 30, to assist in centering the valve, and a slot 42 for a screw-driver, or other suitable tool, is provided for turning the member 31 to the desired adjusted position. The operation of this structure is similar to Fig. 1, and the bleed passage is provided to test the pressure line and being concentric with the member 31, does not interfere with its adjustment. Furthermore, the initial tension put upon the valve 9 can only be effected by removing the valve from its pressure line connection, and this prevents tampering with the adjustment of the valve, which, in the case of a safety valve for compressors, pumps, etc., is a decided advantage as it prevents unauthorized boosting of the pressure in the discharge line while the machine is in operation.

In the structure shown in Fig. 6 the valve 14 is positioned between the seat memers 43 and 44 associated with a casing 45, the member 44 having a threaded shank 46 adjustably mounted in a threaded bore 47 in the casing 45, and whose open end is closed off by a pipe plug 48, said shank having a slot 49 for permitting its adjustment with a screw-driver, or other suitable tool, inserted through the open end of the bore 47, the casing having a passage 50 and the member 43 having a centrally disposed passage 51, and the valve and its seating members having seating ends reversely inclined from those shown in Fig. 1. With this construction, when the pressure of the fluid in the chamber 52 surrounding the valve exceeds the initial compression tension imposed upon the valve by its abutments, the valve will be compressed and thus leave one or both of its seats and allow fluid to pass out through the passage 51.

Where the fluid is allowed to go to waste, as in a safety valve, it will be understood that the outer casing need not form an enclosure.

While the valve has been more particularly designed as a pressure valve to maintain a certain pressure of fluid in a standpipe system, it may also be used as a safety valve for engines, pumps and compressors; as a discharge valve for pumps and compressors; as an expansion valve in refrigerator systems; and for any other suitable purpose.

The seats on the end of the valve 7 are preferably curved so as to readily obtain a line contact. The valve may be made of suitable steel or alloy steel, phosphor bronze, or other metal best suited for the working conditions, and by the term "metal" I mean to include alloys or metal compositions having elastic properties.

It will be understood that the amount of pressure necessary to open the valve will depend, among other things, upon the thickness of the ring, that is, the area of its cross-section, and hence for light pressures the valve wall should be thin as compared to thicker walls for heavier pressures.

I desire it to be understood that this invention is not to be limited to any specific form or arrangement of parts except in so far as such limitations are included in the claims or necessitated by the prior art.

What I claim as my invention is:

1. In an automatic, pressure-controlling valve, the combination of a pair of spaced, relatively fixed, seating abutments, an unbroken hollow tube of spring metal having valve-seating faces at its open ends mounted to normally seat on said abutments and forming a valve movable away from either of the same by pressure acting on one of its walls, means for conducting pressure fluid to that wall of the valve, and means for putting said valve under a predetermined initial seating and internal tension tending to resist its opening.

2. In an automatic, pressure-controlling valve mechanism, the combination of a pair of spaced seating abutments, an unbroken ring of spring metal having valve-seating faces at its ends mounted to seat on said abutments and forming a valve movable away from either of the same by fluid pressure acting on one of its surfaces, one of said abutments being adjustable to initially tension said valve, and means for conducting pressure fluid to that surface of the valve upon which pressure is applied to open the valve.

3. In an automatic, pressure-control valve, the combination of a pair of spaced seating abutments, an unbroken ring of spring metal having valve-seating faces at its open ends mounted to normally seat on said abutments and forming a valve uniformly resisting a pressure tending to spread it, and means for conducting pressure fluid through one of said abutments to the inner surface of the valve to expand said ring and thus release it from seating engagement with one or both of said abutments at a predetermined pressure.

4. In a valve mechanism, the combination of a pair of spaced seating abutments, a ring of spring metal having valve-seating faces at its ends, mounted to seat on said abutments and forming a valve movable away from the same by pressure acting on one of its surfaces, means for conducting the fluid controlled by the valve to said surface, one of said abutments being adjustable to vary the tension of the valve, a casing associated with said abutments, said adjustable abutment being so mounted in said casing as to prevent its adjustment except when disconnected from its pressure source.

5. In a valve mechanism, the combination with a pair of spaced seating abutments, a ring of spring metal having valve-seating faces at its ends mounted to seat on said abutments, one of said abutments having a bleed passage, a needle-valve adapted to close off said bleed passage, and a casing associated with said abutments and said needle-valve.

6. In an automatic, pressure-operated valve mechanism, the combination of a relatively fixed abutment, of an unbroken spring metal tube seating at one end against said abutment, and means for exerting a spreading pressure against said tube tending to hold said end against said abutment under a predetermined initial tension, said tube being yieldable under pressure of fluid exerted against its wall to establish an opening between it and said fixed abutment.

In testimony whereof, I affix my signature.

LOUIS O. FRENCH.